United States Patent
Ineichen et al.

(10) Patent No.: US 9,487,341 B2
(45) Date of Patent: Nov. 8, 2016

(54) APPARATUS FOR DISPENSING FLOWABLE SUBSTANCES

(71) Applicant: ROBATECH AG, Muri (CH)

(72) Inventors: Beatus Ineichen, Weggis (CH); Martin Meier, Zufikon (CH)

(73) Assignee: ROBATECH AG, Muri (CH)

(*) Notice: Subject to any disclaimer, the term of this patent is extended or adjusted under 35 U.S.C. 154(b) by 0 days.

(21) Appl. No.: 14/452,709

(22) Filed: Aug. 6, 2014

(65) Prior Publication Data
US 2015/0041501 A1    Feb. 12, 2015

(30) Foreign Application Priority Data
Aug. 6, 2013    (EP) .................................... 13179406

(51) Int. Cl.
B67D 1/08    (2006.01)
B65D 83/28    (2006.01)
(Continued)

(52) U.S. Cl.
CPC ........... B65D 83/28 (2013.01); B05B 15/0208 (2013.01); B01J 4/008 (2013.01); B05B 1/326 (2013.01); B05B 15/02 (2013.01); B05C 5/02 (2013.01); B05C 5/0225 (2013.01); B05C 5/0229 (2013.01); B65D 83/34 (2013.01);
(Continued)

(58) Field of Classification Search
CPC .......... B67D 1/07; B67D 3/00; B65D 83/34; B65D 83/28; B05B 1/326; B05B 15/001; B05B 15/02; B05B 15/0216; B05B 15/0225; B05B 15/0233; F16K 23/00; B05C 5/00; B05C 5/02; B05C 5/0225; B05C 5/0229; B05C 11/1026; B05C 11/1031; B01J 4/008

USPC ...... 118/321, 323, 40–42, 203, 302; 222/63, 222/321.3, 409, 504, 571, 517, 333, 342, 222/538, 148–151, 410, 559–561, 404
See application file for complete search history.

(56) References Cited

U.S. PATENT DOCUMENTS 5,240,502 A * 8/1993 Castaldo ............. B05B 15/0208
                                                 118/302
5,638,986 A * 6/1997 Tuominen et al. ............... 222/1
(Continued)

FOREIGN PATENT DOCUMENTS

DE    3528926 A1    2/1987
DE    3908453 A1    9/1990
(Continued)

*Primary Examiner* — Paul R Durand
*Assistant Examiner* — Andrew P Bainbridge
(74) *Attorney, Agent, or Firm* — Browdy and Neimark, PLLC (57) ABSTRACT

An apparatus for dispensing flowable substances, having a nozzle having an exit opening for dispensing the substances from the nozzle, and a closure part movable by a control element, disposed outside of the nozzle, and configured to release the exit opening and close the exit opening, in the region of a closure part surface that faces the nozzle end. The closure part surface is delimited, in the movement direction of the closure part from the open position to the closed position, by a leading edge, in the leading direction. The closure part surface is disposed next to the nozzle and at a level upstream from the exit opening, with reference to the flow direction of the substances through the nozzle, in the open position. The closure part can be moved from the open position to the closed position by the control element, such that the leading edge of the closure part surface is moved past the free nozzle end.

17 Claims, 10 Drawing Sheets

(51) Int. Cl.
   *F16K 23/00*   (2006.01)
   *B05C 5/02*    (2006.01)
   *B05B 15/02*   (2006.01)
   *B01J 4/00*    (2006.01)
   *B65D 83/34*   (2006.01)
   *B05B 1/32*    (2006.01)
   *B67D 3/00*    (2006.01)

(52) U.S. Cl.
   CPC .................. *B67D 1/08* (2013.01); *B67D 3/00* (2013.01); *F16K 23/00* (2013.01)

(56) References Cited

U.S. PATENT DOCUMENTS

| | | | |
|---|---|---|---|
| 5,782,274 A * | 7/1998 | Kaneko | B65B 39/00 141/370 |
| 6,024,250 A | 2/2000 | Hickey | |
| 6,159,291 A * | 12/2000 | Morita et al. | 118/321 |
| 6,267,157 B1 * | 7/2001 | Gruson | B67C 3/001 141/90 |
| 6,321,945 B1 * | 11/2001 | Girouard et al. | 222/113 |
| 6,568,561 B2 * | 5/2003 | Studer et al. | 222/63 |
| 6,592,672 B1 * | 7/2003 | Mizuno | B05B 7/0815 118/305 |
| 7,228,879 B2 * | 6/2007 | Miller | B01F 13/1069 141/271 |
| 7,261,131 B2 * | 8/2007 | Cleveland | B65B 3/36 141/192 |
| 8,387,668 B2 * | 3/2013 | Macquet | B67C 3/004 141/90 |
| 8,757,216 B2 * | 6/2014 | Meinzinger | B67C 3/002 141/1 |
| 2012/0168652 A1 * | 7/2012 | Saine | 251/12 |

FOREIGN PATENT DOCUMENTS

| | | |
|---|---|---|
| DE | 4113445 A1 | 10/1991 |
| DE | 29809483 U1 | 10/1999 |
| EP | 2006030 A2 | 12/2008 |
| FR | 2972944 A1 | 9/2012 |
| JP | 2012232269 A | 11/2012 |

* cited by examiner

APPARATUS FOR DISPENSING FLOWABLE SUBSTANCES

FIELD

The present invention relates to an apparatus for dispensing flowable substances, particularly adhesives, paints, varnishes, and release agents.

BACKGROUND

Apparatus for dispensing flowable substances, particularly adhesives, paints, varnishes, and release agents are used, for example, in order to apply adhesives to a substrate, portion by portion. In this connection, application of the adhesives takes place controlled by way of a metering valve, where application as a line, point, spray, spiral, or surface area is particularly possible.

In the processing of flowable substances with metering valves, it is problematic that residues of the substance can accumulate at the outlet of the metering valve, and, particularly if they harden there, can disrupt subsequent operation of the apparatus or can actually bring it to a complete stop.

To avoid such difficulties, an apparatus is proposed in DE 41 13 445 A1.

This apparatus has a nozzle that has an exit opening for dispensing the substances from the nozzle in the region of a free nozzle end. A closure part that can be moved by means of a control element is disposed outside of the nozzle, which part releases the exit opening in an open position and closes the exit opening in a closed position, in the region of a closure part surface that faces the nozzle end. The closure part surface is delimited, in the movement direction of the closure part from the open position to the closed position, by a leading edge, in the leading direction. When the closure part is moved into its closed position, the leading edge therefore makes contact with the free nozzle end first, in each instance, before the closure part contacts the free nozzle end over the full area with its closure part surface, and closes off the exit opening of the nozzle. This action of the free nozzle end on the leading edge during every closing procedure of the closure part leads to increased wear of the leading edge and thereby to a reduced useful lifetime of the apparatus.

An apparatus for dispensing flowable substances is furthermore described in DE 199 36 670 C1. This apparatus has a fixed support, a metering valve connected to this support, having an exit nozzle for the flowable substances, and also an outer closure part for closing the exit opening of the nozzle. In this connection, the closure part is stationary and the metering valve or the nozzle is pivoted relative to the closure part. In this embodiment, as well, a leading edge of the closure part contacts the nozzle in the region of the free nozzle end during the closing procedure, in each instance, resulting in the disadvantage described, that of increased wear of the closure part in the region of the leading edge.

An apparatus for dispensing flowable substances, having a nozzle and a closure part for the nozzle, is furthermore known from EP 0 719 592 A2. In this apparatus, as well, a leading edge of the closure part contacts the nozzle in the region of its free nozzle end when the closure part is moved into its closed position.

SUMMARY

It is the object of the present invention to further develop an apparatus for dispensing flowable substances, which has a nozzle that has an exit opening for dispensing the substances from the nozzle in the region of a free nozzle end, and a closure part that can be moved by means of a control element, disposed outside of the nozzle, which part releases the exit opening in an open position and closes the exit opening in a closed position, in the region of a closure part surface that faces the nozzle end, wherein the closure part surface is delimited, in the movement direction of the closure part from the open position to the closed position, by a leading edge, in the leading direction, in such a manner that a large number of closing cycles can be performed without damage to the closure part.

This object is accomplished by means of an apparatus in which it is provided, according to the invention, that the surface of the closure part that faces the nozzle end, i.e. the closure part surface, is disposed next to the nozzle and at a level upstream from the exit opening, with reference to the flow direction of the substances through the nozzle, in the open position. Furthermore, it is provided, according to the invention, that the closure part can be moved from the open position to the closed position, by means of the control element, in such a manner that the leading edge of the closure part surface is moved past the free nozzle end.

Accordingly, the closure part does not contact the nozzle in the region of its free nozzle end with the leading edge first when the closure part is moved from the open position to the closed position, but rather, the leading edge is guided past this nozzle end, thereby causing the closure part to come into initial contact with the nozzle behind the leading edge. In this way, damage to the leading edge when the closure part is moved from the open position to the closed position is excluded. The exit opening of the nozzle is cleaned by means of the movement of the closure part.

It is viewed as being particularly advantageous if the closure part contacts the free nozzle end over as large an area as possible when contact is made with the nozzle, thereby causing closure of the exit opening of the nozzle to take place directly.

The movement of the closure part relative to the nozzle, in the region of the exit opening, is preferably selected in such a manner that the closure part is moved with a movement component perpendicular to the flow direction of the substances through the nozzle, with reference to the exit opening. Consequently, this movement brings about the result, at a high degree of effectiveness, that the closure part almost completely entrains substance residues that have accumulated in the region of the exit opening of the nozzle, toward the side, and thereby frees the nozzle of substance residues in the region of the exit opening.

The placement of the closure part surface, in the open position, next to the nozzle and at a level upstream from the exit opening, makes it possible, on the one hand, to dispose the closure part, in the region of its closure part surface, adjacent to the nozzle, but in a region in which the closure part or the closure part surface does not hinder dispensing of the flowable substances out of the nozzle. The known arrangement of the closure part surface makes it possible to structure the apparatus in very compact manner in the region of nozzle and closure part, particularly the closure part surface. This is advantageous because it allows disposing a great number of nozzles with closure parts assigned to them side by side next to one another. The advantage of this configuration shows itself in that adhesive tracks can be applied to the substrate at a close distance from one another, of 15 mm, for example, particularly 13 mm.

Preferably, the application apparatus/metering unit that has the nozzle is provided with an integrated guide shoe, which guides a substrate that moves underneath the nozzle. In this connection, a narrow and thin configuration of the closure part allows a small distance between the exit opening of the nozzle and the substrate, for example a distance of maximally 5 mm, particularly 3 mm. Furthermore, the kinematics of the closure part make it possible for the nozzle to remain in its metering position while the closure part is being moved into its closed position.

Preferably, the nozzle is configured to narrow in the direction of the nozzle end, and the closure part surface is disposed next to the narrowing nozzle region in the open position. This configuration of the nozzle end contributes to moving the closure part on a short setting path from its open position to its closed position, by performing a relatively simple setting movement between the open position and the closed position.

According to a particular embodiment of the invention, it is provided that the closure part has a spring property. This property makes it possible to press the closure part surface against the nozzle at a certain bias after contact with the exit opening of the nozzle, and thereby to guarantee secure closure of the exit opening.

Fundamentally, it is possible that the closure part is configured in one piece, and thereby, in particular, does not have different material properties in the region of the closure part surface and the remaining region of the closure part, particularly a bearing region of the closure part. In this case, the closure part preferably consists of metal or plastic.

Preferably, the closure part is configured in such a manner that it has a closure part section that has the closure part surface in the region of its end facing away from the control element. In the region of the one end, the closure part is mounted in the control element, i.e., in the element for moving the closure part from the open position to the closed position. In the region of the other end, the closure part has the closure part section with the closure part surface, i.e., the surface by means of which the exit opening of the nozzle can be closed.

According to a preferred further development, it is provided that the closure part section has a base element and a plate accommodated by the base element, where the plate has the closure part surface on its side facing away from the base element. The base element represents the support element for the plate, which has a different material property from that of the base element. Preferably, the plate is elastically deformable, and particularly has rubber-elastic properties.

The configuration of the plate as an elastic component has the advantage that the plate, in the closed position, contacts the nozzle under bias, i.e. elastic deformation in the region of its exit opening, and thereby closes it securely. The elastic property is also advantageous because the closure part section already contacts and closes the nozzle in the region of its exit opening even before a final displacement position of the closure part has been reached, and the closure part is moved into its closed position with elastic deformation of the plate, under some circumstances with a changed deformation of the plate. Therefore the elastically deformable plate can act on the nozzle end with maximal, elastically caused force, in the end position of the closure part, or, instead, can act on the nozzle end with less elastic bias, as a result of the completed movement of the closure part.

It is viewed as being advantageous if the leading edge of the closure part surface of the plate-shaped closure part section coincides with a leading edge of the base element. With reference to the respective leading edge, the closure part therefore has a uniform design.

Structurally, the closure part is particularly configured in such a manner that it has an end-side mounting section in the region of which the closure part is mounted on the control element side, the end-side closure part section, and a connecting arm between the mounting section and closure part section. This connecting arm allows transfer of movement from the control element, which cannot be positioned in the immediate vicinity of the nozzle end, to the nozzle end. The connecting arm particularly consists of metal or plastic.

The closure part is preferably configured in plate form, i.e., produced from a relatively thin-walled material.

With reference to the longitudinal expanse of the closure part, this can have a varying cross-section, for example a polygonal cross-section, particularly a rectangular cross-section with rounded corners, or a round cross-section.

It is viewed as being particularly advantageous if the closure part can be moved, by means of the control element, in such a manner that the closure part surface is moved parallel when being moved from the open position to the closed position. The closure part therefore performs a rather simple movement.

In particular, it is provided that the closure part can be moved, by means of the control element, in such a manner that the closure part surface is disposed perpendicular to an exit axis of the exit opening of the nozzle when it is moved from the open position to the closed position. This placement of the closure part surface in the closed position of the closure part guarantees that flowable substances that adhere to the nozzle in the region of its exit opening do not drip off the closure part when the closure part is moved, but rather remain on the closure part surface situated perpendicular to the exit axis of the exit opening of the nozzle, and can be removed from the closure part by means of suitable aids. By means of this arrangement of the closure part surface, flowable substances that adhere to the exit opening of the nozzle are prevented from getting out of the region of the closure part, particularly into the region of the substrate, in uncontrolled manner.

Preferably, the closure part can be moved, by means of the control element, in such a manner that the closure part surface is moved, in the case of contact with the nozzle in the region of its exit opening, with a movement component perpendicular to an exit axis of the exit opening of the nozzle, relative to the latter. This movement of the closure part brings about cleaning of the nozzle in the region of its exit opening, as described.

It is viewed as being particularly advantageous if the closure part can be moved, by means of the control element, in such a manner that the closure part surface is moved in an arc shape from the open position to the closed position, particularly at over-dead-center locations in the open position and in the closed position of the closure part, as well as at a dead-center location in an intermediate position between the open position and the closed position. Accordingly, the closure part, when placed next to the nozzle, is moved out of the over-dead-center location in the open position to the dead-center location, in which the closure part surface is disposed at a slight distance from the exit opening of the nozzle, and is then moved once again into an over-dead-center location, in which the closure part surface lies against the nozzle in the region of the exit opening of the nozzle and closes off this exit opening. This movement of the closure part surface from the one over-dead-center location to the dead-center location and from this dead-center location to the other over-dead-center location takes place, in particular, with an exclusively parallel displacement movement of the closure part surface. This movement sequence needs only a small space requirement for moving the closure part from the open position to the closed position.

The control element for moving the closure part can certainly be structured in such a manner that it serves both for moving the closure part from the open position to the closed position and for moving the closure part from the closed position to the open position. In this case, it is particularly provided that the movement of the closure part from the open position to the closed position is brought about by means of a movement of the control element, and that the movement of the closure part from the closed position to the open position is achieved by means of a corresponding reverse movement of the control element. Fundamentally, however, it is certainly possible that the control element serves only for moving the closure part from the open position to the closed position. The movement from the closed position to the open position can take place by way of a different control element, for example by means of a reset spring.

According to a particular embodiment of the invention, a configuration of the control elements is provided, wherein the control element has a frame, a transfer medium that brings about shape fit and has wheels, which medium generates angle synchronicity of wheels mounted in the frame so as to pivot, a drive for the belt drive for pivoting the respective wheel in a pivot direction and in a pivot direction opposite to that direction, a bearing element for the closure part, mounted in wheels so as to pivot, wherein the bearing element is mounted about pivot axes in these wheels, so as to pivot, wherein these pivot axes are disposed in the frame parallel to the pivot axes of these wheels, wherein the closure part is mounted in the bearing element.

The movement of the closure part from the open position to the closed position and from the closed position to the open position is thereby brought about by means of the transfer medium. This medium requires only little construction space in the direction perpendicular to the movement direction of the closure part, because it has a compact structure in this direction. This makes it possible to dispose multiple apparatuses, accordingly multiple metering units having nozzles, relatively closely next to one another, side by side. The transfer medium is a robust drive that permanently acts reliably, for moving the closure part. By means of wheels of the transfer element, the bearing element is mounted in these wheels so as to pivot in defined manner, thereby guaranteeing precise guidance of the bearing element. This ensures precise displacement of the closure part between the open position and the closed position.

The mounting of the bearing element in the wheels brings about the result that the bearing element and thereby the closure part mounted in the bearing element perform a non-linear movement when the drive is activated. The bearing axles of the bearing elements in the wheels move on a circular track, corresponding to the pivot movements of the wheels, and thereby the closure part also moves on a circular track. This fundamentally makes it possible to position the closure part relative to the nozzle in such a manner that the leading edge of the closure part does not make contact with the nozzle, but rather is moved past the nozzle, so that the closure part makes full-area contact with the exit opening of the nozzle only behind the leading edge.

The apparatus according to this further development allows simple movement of the closure part from the open position to the closed position and vice versa. This movement is caused by means of driving the transfer medium in opposite directions, thereby moving wheels for moving the closure part from the open position to the closed position in one pivot direction, and in the opposite pivot direction for moving from the closed position to the open position.

The drive for the transfer medium is preferably mounted in the frame. In this connection, the drive particularly has a connecting element that can be moved back and forth and is connected with the transfer medium. The drive works together with this connecting element. For example, an actuator with linear action, which forms a component of the drive, acts on the connecting element in the sense that it is moved in the one running direction when the actuator is actuated. If the actuator is not actuated, a spring that acts as a component of the drive, for example, particularly acts directly on the actuator, so that the actuator is reset and the connecting element is moved back to the starting position when this happens.

Preferably, the connecting element is connected with a straight section of the transfer medium and can be moved in a straight line in the opposite direction. The connecting element thereby engages on the transfer medium in that region in which the section of the transfer medium assigned to the connecting element is configured in a straight line.

The drive for the transfer medium can also be structured as a pivot drive, for example, which drive particularly drives one of the wheels of the transfer medium directly.

The transfer medium particularly has a belt drive, or a rod that connects the wheels and is mounted in the wheels so as to pivot, or a set of gears. For example, in the case of the belt drive, a belt, particularly a toothed belt, steel strip, chain or the like loops around the wheels of the belt drive. Alternatively, the transfer medium has two wheels that are connected by means of the rod as a component of the transfer medium or that mesh with a common gear rack that forms an integral part of the transfer medium, or, in the case of the configuration as a set of gears, three wheels that mesh with one another and form the transfer medium, of which the first and the third wheel have the same pivot direction and in which the bearing element is mounted. By means of this embodiment, a clear kinematic relationship between the wheels that accommodate the bearing element is guaranteed.

Further characteristics of the invention are represented in the dependent claims, the description of the drawing of the figures, and the figures themselves, in which connection it is noted that all the individual characteristics and all the combinations of individual characteristics are essential to the invention.

BRIEF DESCRIPTION OF THE DRAWINGS

In the figures, the invention is represented using preferred exemplary embodiments, without being restricted to these.

DETAILED DESCRIPTION

Figure 1:
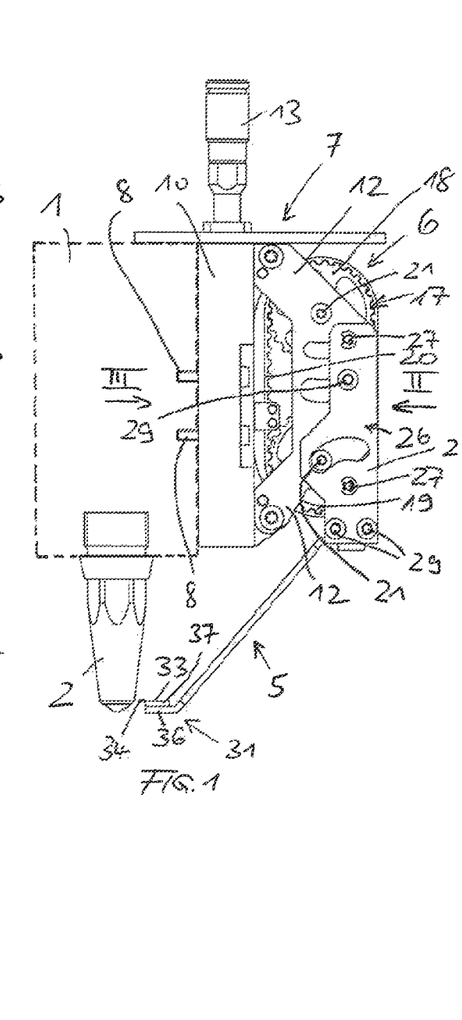
FIG. 1, for a first exemplary embodiment, shows a side view of the apparatus according to the invention, where a housing of a metering valve having a nozzle is also illustrated with broken lines (in a view I according to FIG. 2), where a closure part of the apparatus is illustrated in an open position.
Figure 2:
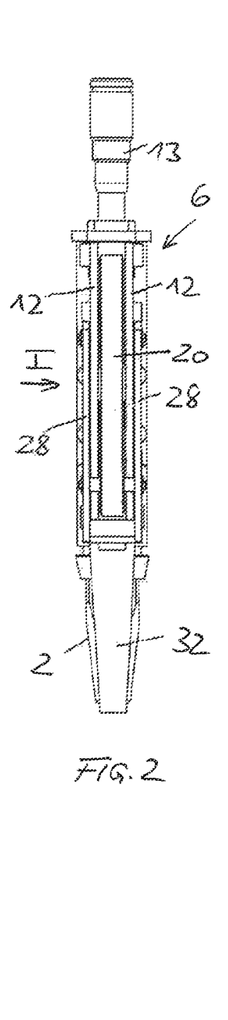
FIG. 2 shows a view of the apparatus according to arrow II in FIG. 1.
Figure 3:
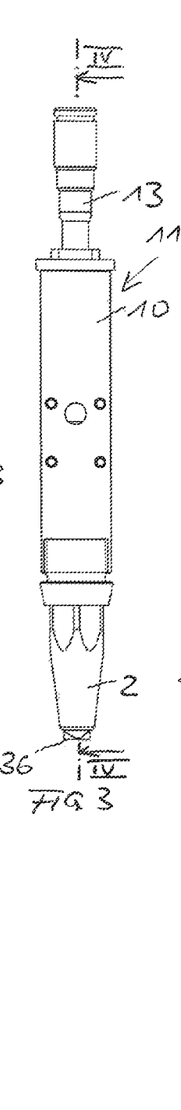
FIG. 3 shows a view of the apparatus according to arrow III in FIG. 1.

The apparatus according to the invention, which is shown with regard to the first exemplary embodiment in FIGS. 1 to 13, serves for dispensing flowable substances, particularly adhesives, paints, varnishes, and release agents, for the purpose of application to a substrate. In this connection, dispensing of the flowable substances takes place controlled by way of a metering valve, which is illustrated in FIG. 1, only with regard to its housing 1, in greatly simplified manner by means of the broken line, and by way of the nozzle 2 mounted in the housing 1. In the other figures, the housing 1 is not shown; rather, only the nozzle 2 is shown.

Different types of application to a substrate are possible by way of the metering valve, for example application as a line, dot, spray, spiral or surface area.

In the region of its free nozzle end 3, the nozzle has an exit opening 4 for dispensing the substances from the nozzle 2. A closure part 5 is disposed outside of the nozzle 2, which part can be moved by means of a control element 6. In its open position, which is illustrated in FIGS. 1 to 4 and 7 to 10, the closure part 5 releases the exit opening 4, and closes the exit opening 4 in the closed position illustrated in FIGS. 5 and 6.

The control element 6 has a frame 7. This frame 7 is screwed onto the housing 1 by means of screws 8. The housing 1 is stationary. The frame 10 has a housing 10 of an actuator 11 configured as a pneumatic cylinder, and, on the side facing away from the housing 1, two plate-shaped frame sections 12 disposed parallel to one another. The actuator 11 has a connector 13 for supplying compressed air, and a cylinder space 14 assigned in the housing 10, for displaceable accommodation of a piston 15. The piston 14 can be displaced under the effect of compressed air, counter to the force of a spring 16.

The frame sections 12 are screwed onto tabs 39 affixed to the housing 10, in the region of the ends of the housing 10, to which the connector 13 and the spring 16 are assigned.

A transfer medium 17 is mounted in the frame 7, in concrete terms in the two frame sections 12, which medium is configured as a belt drive. This drive has two wheels 18, 19 configured as gear wheels, and a belt 20 that loops around them, which is configured as a toothed belt. The two wheels 18 and 19 are configured identically, and a straight line 22 connects the bearing axles 21 of the wheels 18 and 19, which line is disposed parallel to the stroke direction of the piston 15. Accordingly, belt sections 23 run parallel to the straight line 22 and to the longitudinal axis of the piston 15 between the two wheels 18, 19.

A connecting element 24 is connected with the piston 15, which element is disposed radially and passes through an oblong hole 25 in the housing 10, where the end of the connecting element 24 that exits from the housing 10 is firmly connected with the belt 20 in the region of the one belt section 23 that faces the housing 10. Accordingly, a stroke movement of the piston 15, under the effect of compressed air, leads to movement of the belt 20 by a corresponding distance, counterclockwise, and the reset movement of the piston, without the effect of compressed air and under the effect of the spring 16, leads to a reset movement of the belt 20 by the corresponding stroke distance of the piston 15. Therefore the wheels 18 and 19 are pivoted in a pivot direction and in an opposite pivot direction, about the same respective pivot angle, by means of the pneumatic drive and the spring, respectively.

A bearing element 26 for the closure part 5 is mounted in the two wheels 18, 19 at a distance from the pivot axles of the wheels 18, 19. In this connection, the bearing element 26 is mounted so as to pivot about axles 27 of the wheels 18, 19, which are disposed parallel to the pivot axles 21 of the wheels 18, 19. The bearing element 26 has two plate-shaped bearing element sections 28, and connecting elements 29 that connect these sections. The bearing sections 28 are disposed parallel to the frame sections 23; furthermore, the frame sections 23 are disposed between the bearing element sections 28. The two frame sections 12 accommodate the transfer medium 17 and the wheels 18, 19, respectively, with slight axial play, and the respective bearing element section 28 is disposed at a slight distance from the assigned frame section 12. This can particularly be seen in the representation of FIG. 2, which illustrates that the control element 6 is structured in very compact manner in the direction of the bearing axles 21.

In the region of one end, the closure part 5 has a bearing section 30 that is connected with the bearing element 26 in the region of the connecting elements 29 adjacent to the wheel 19. In the region of the opposite end, the closure part 5 has a closure part section 31 for contacting the exit opening 4. Furthermore, the closure part 5 has a connecting arm 32 that connects the bearing section 30 and the closure part section 31. The closure part 5 is configured in plate shape and has an expanse in the axle direction of the wheels, i.e. in the expanse of the bearing axles 21, which is less than the expanse of the bearing element 26 in this direction.

Figure 11:
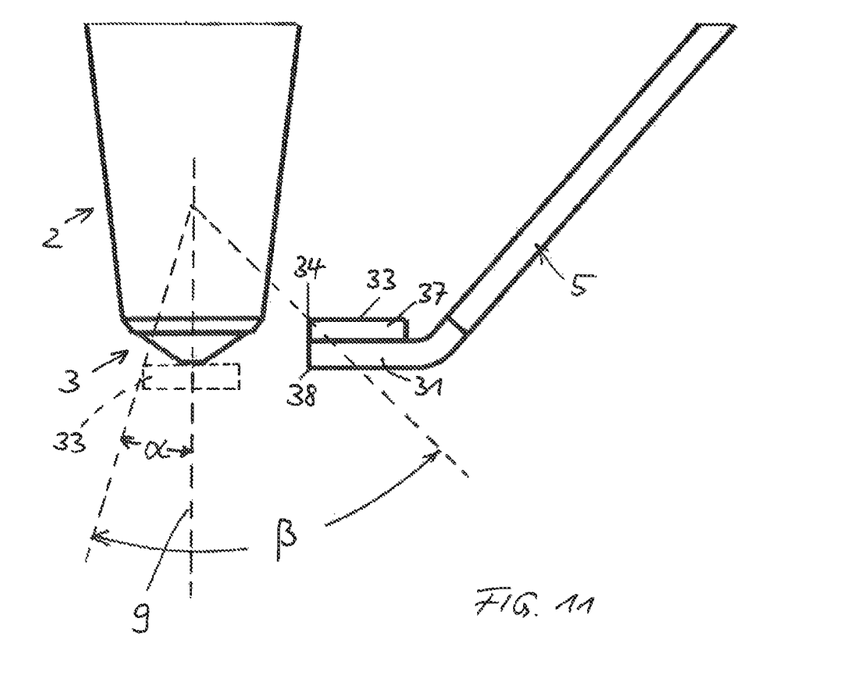
FIG. 11 shows a detailed representation of the closure part in the region of its end that serves for closing the exit opening of the nozzle of the metering valve, illustrated in an enlarged representation for the open position and the closed position of the closure part, with reference to the end of the nozzle facing the closure part.

When comparing FIGS. 1 and 5 or 4 and 6 and the detail representation according to FIG. 11, it can be seen that the closure part surface 33, i.e. that surface of the closure part section 31 that serves for closing the exit opening 4 of the nozzle 2 in the closed position of the closure part 5, is disposed next to the nozzle 2 and at a level upstream from the exit opening 4, with reference to the flow direction of the substances through the nozzle 2, in the open position. Furthermore, it can be seen that the closure part 5 can be moved from the open position to the closed position by means of the control element 6, in such a manner that a leading edge 34 of the closure part surface 33 is moved past the conically narrowing free nozzle end 3. In this connection, in the closed position of the closure part 5, a straight connecting line between the pivot axle of the respective wheel and the pivot axle of the bearing element in this wheel, illustrated for the one wheel 18 by the straight connecting line 35, encloses an angle with the straight line 22 that connects the pivot axles 21 of the wheels 18, 19 of 5 to 25°, preferably 10 to 20°, particularly 15°. This angle α is illustrated in FIG. 11 for the region of the nozzle 2, where the angle α is clearly represented on a larger scale there, for a better illustration. In total, the respective wheel 18, 19 can be pivoted by an angle of 50 to 70°, preferably 55 to 65°, particularly 61°, by means of the drive. This pivot angle β is illustrated in FIG. 11, once again for the region of the nozzle 2.

The closure part section 31 has a base element 36 and a plate 37 accommodated by the base element 36. The plate 37 has the closure part surface 33 on its side facing away from the base element 36. The plate 37 is elastically deformable; in particular, it has rubber-elastic properties. The base element 36, the connecting arm 32, and the bearing section 30 consist of metal and have a spring property.

The closure part surface 33 is level. When the closure part 5 is moved from the open position to the closed position and vice versa, the closure part surface 33 is disposed perpendicular to the straight line 22 that connects the wheels and parallel to the pivot axles 21 of the wheels 18, 19. Accordingly, the closure part surface is moved parallel when it is moved from the open position to the closed position and vice versa. In this connection, the closure part surface 33 is disposed perpendicular to the exit axis 9 of the exit opening 4 of the nozzle 2.

The leading edge 34 of the closure part surface 33 coincides with a leading edge 38 of the base element 36.

Figure 4:
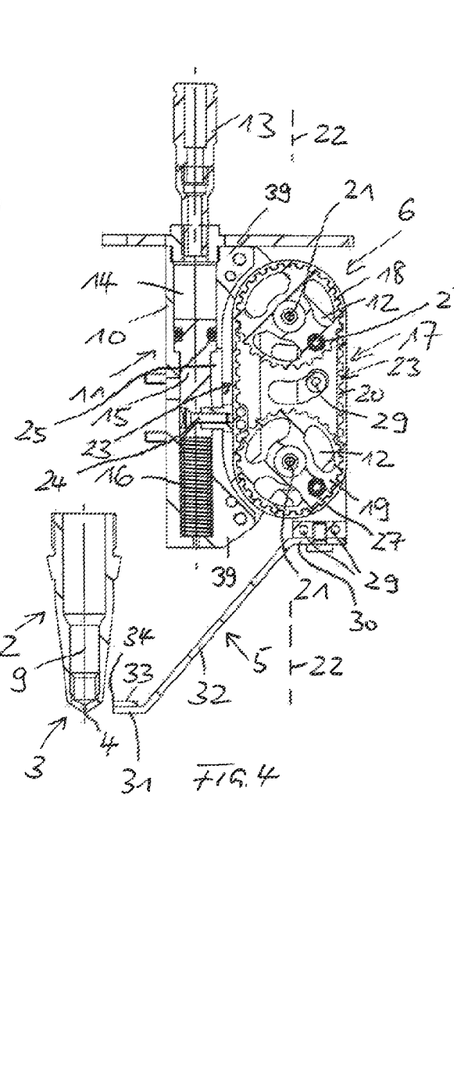
FIG. 4 shows the apparatus in a sectional representation according to the line IV-IV in FIG. 3.
Figures 5, 6:
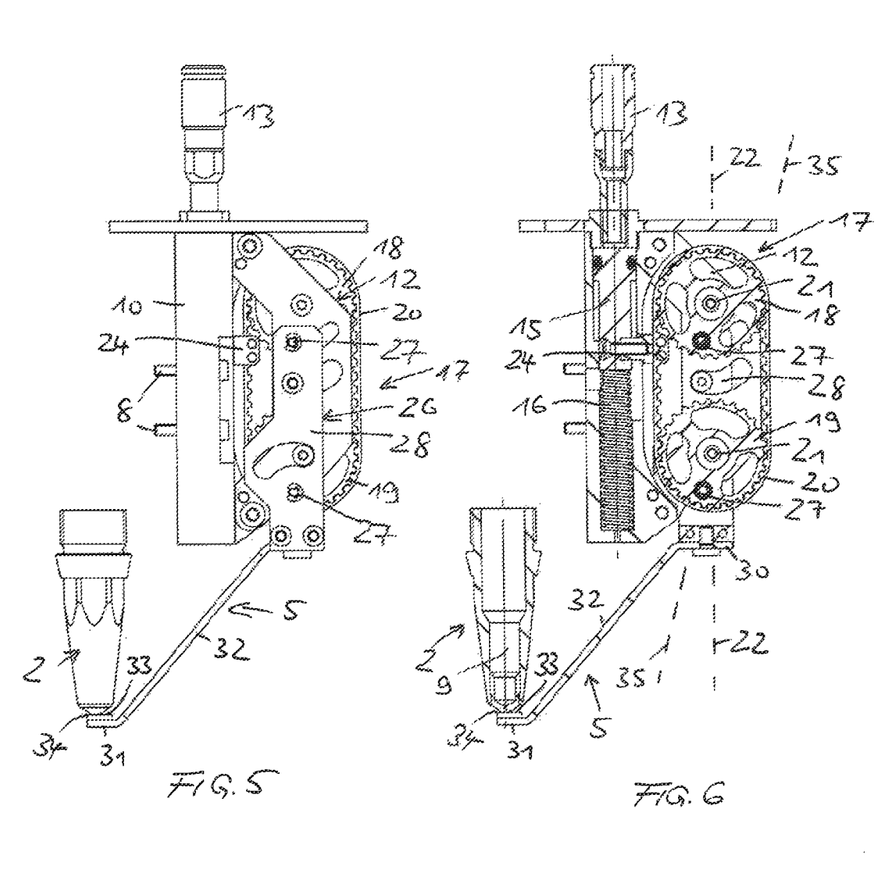
FIG. 5 shows the apparatus in a representation according to FIG. 1, thus illustrated without the housing of the metering valve, but illustrated for the closure part situated in the closed position.
FIG. 6 show the apparatus according to FIG. 5 in a sectional representation according to FIG. 4.
Figure 7:
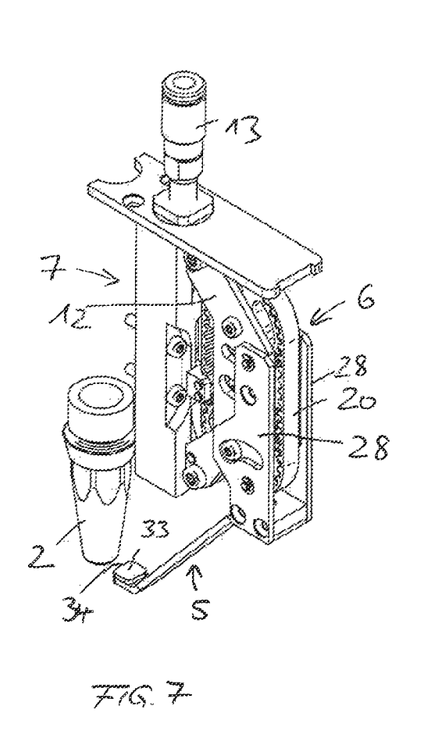
FIGS. 7, 8, 9 and 10 show the apparatus, thus shown without the housing of the metering valve, with the closure part situated in the open position, illustrated in different spatial views.
Figure 8:
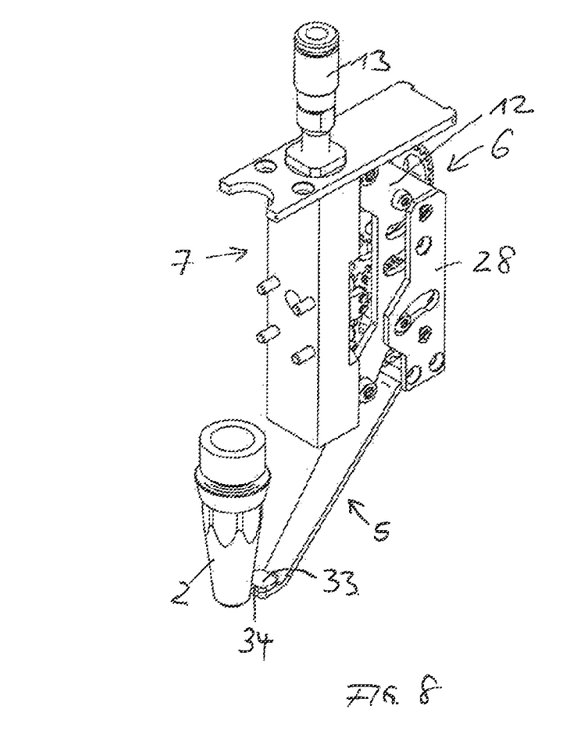
Figure 9:
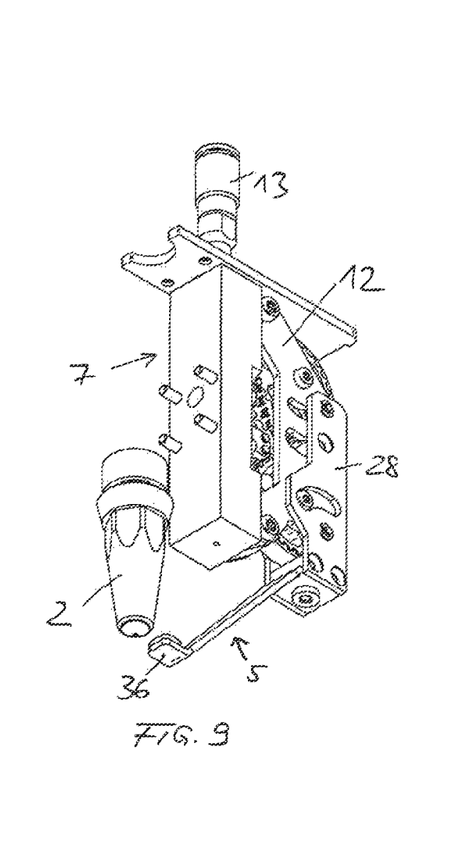
Figure 10:
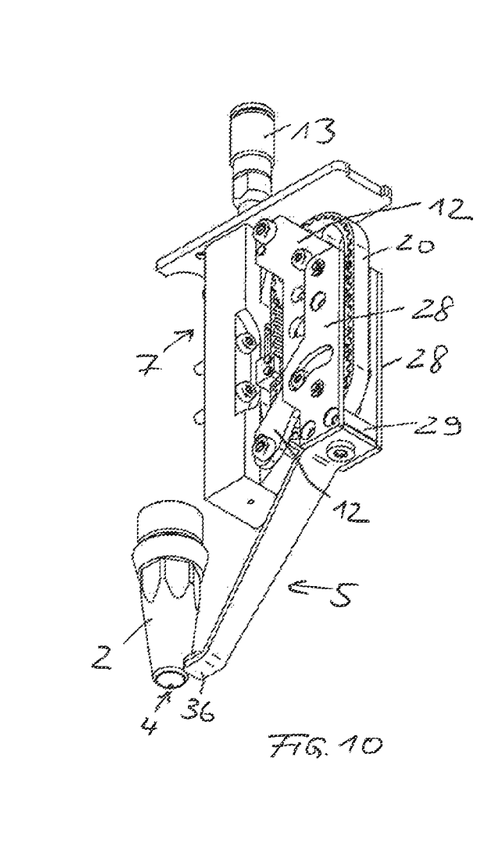

As can be seen in the representation of FIGS. 1 and 4, the closure part 5, in the open position, is situated next to the narrowing, particularly conically narrowing nozzle end 3, in the region of its closure part surface 33. Because of the wheel kinematics of the control element 6, the closure part 5, proceeding from this open position, is moved in such a manner that the leading edge 34 is moved past the free nozzle end. Therefore the plate 37 comes to lie against the nozzle 2, in the region of the nozzle end 3, only behind the leading edge 34. When the closure part surface 33 contacts the nozzle 2, the closure part 5 and thereby the closure part surface 33 are moved further with a movement component perpendicular to the exit axis 9 of the exit opening 4 of the nozzle 2, relative to the latter. This movement leads to the result that the plate 37 entrains substance residues that have accumulated in the region of the exit opening 4 of the nozzle 2 toward the side, and thereby frees the nozzle 2 of substance residues in the region of the exit opening 4.

The plate 37 can therefore be moved parallel, by means of the control element 6, in such a manner that the closure part surface 33 is moved in arc shape from the open position to the closed position, in concrete terms, proceeding from an over-dead-center location in the open position to a dead-center location before contacting the nozzle 2 by means of the plate 37, and from there into an over-dead-center location in the closed position of the plate 37. In this connection, the spring property of the closure part 5 ensures that the closure part surface 33, after making contact with the exit opening 4 of the nozzle, is pressed against the nozzle 2 with a certain bias, and thereby secure closure of the exit opening 4 is guaranteed. The elastically deformable configuration of the plate 37 also contributes to this.

Figure 12:
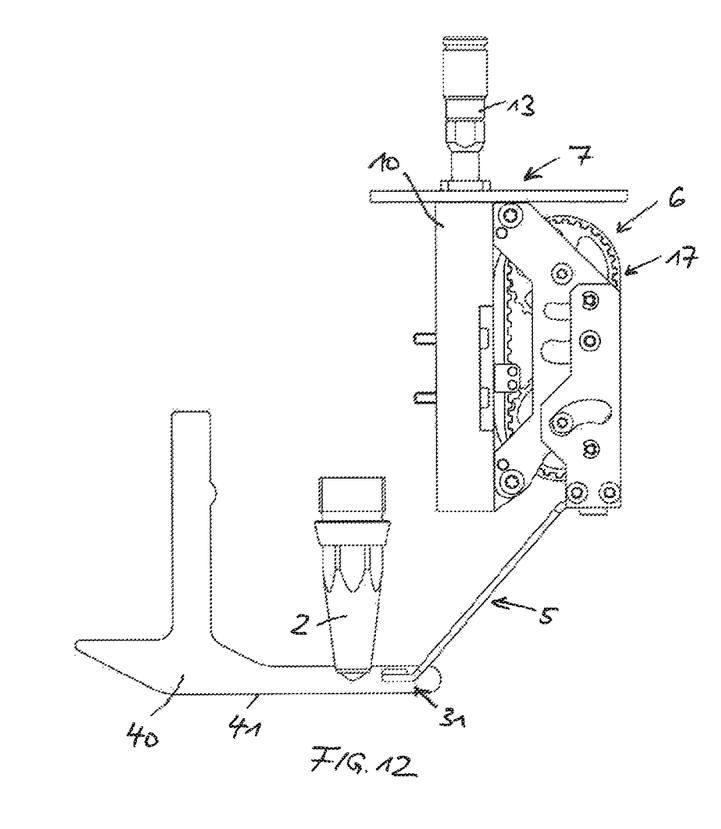
FIG. 12 shows a side view of the arrangement according to FIG. 1, with a guide shoe additionally illustrated.
Figure 13:
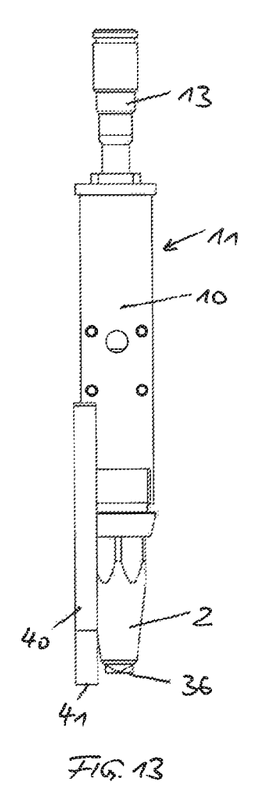
FIG. 13 shows the arrangement according to FIG. 12 in a view according to arrow 13 in FIG. 12.

FIGS. 12 and 13 show that the apparatus illustrated in FIGS. 1 to 11 is additionally provided with an integrated guide shoe 40, which is provided for the purpose of guiding a substrate that moves underneath the nozzle 2, in the region of the underside 41 of the guide shoe 40. In this connection, the narrow and thin configuration of the closure part 5, particularly in the region of the closure part section 31, makes a small distance possible between the exit opening of the nozzle 2 and the substrate that lies against the underside 41, for example a distance of max. 5 mm, particularly 3 mm. Furthermore, the kinematics of the closure part 5 make it possible for the nozzle 2 to remain in its metering position when the closure part is moved to its closed position. The guide shoe 40 is also configured to be rather narrow, as can particularly be seen in the representation of FIG. 13, and particularly has a constant thickness, so that an essentially plate-shaped configuration of the guide shoe 40 results.

Figure 14:
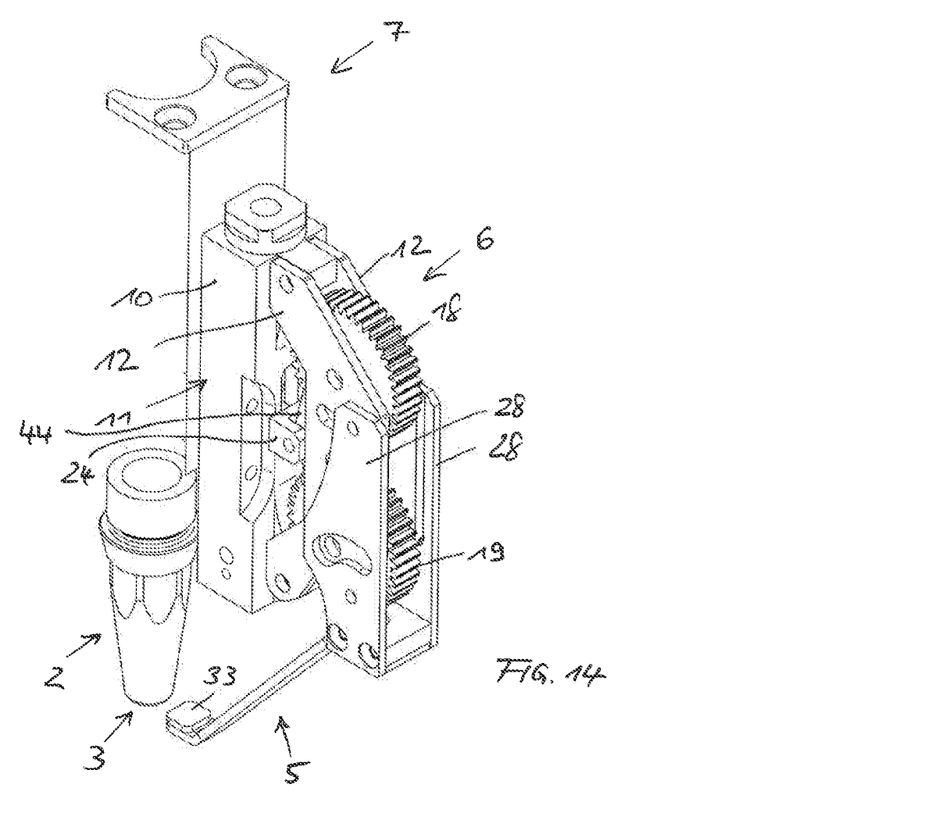
FIG. 14 shows for a second exemplary embodiment, the apparatus, thus shown without the housing of the metering valve, with the closure part situated in the open position, illustrated in a spatial view according to the representation of FIG. 7 relating to the first exemplary embodiment.
Figure 15:
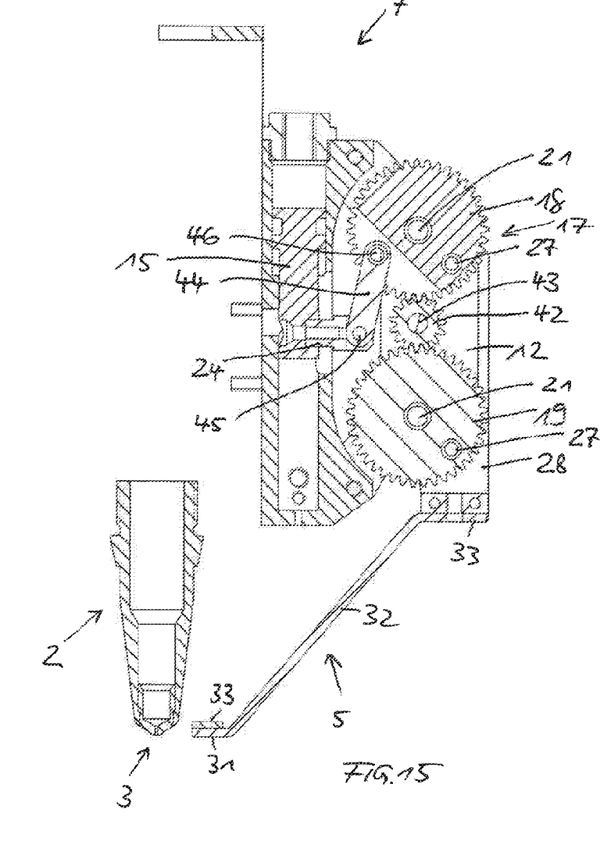
FIG. 15 shows a sectional representation of the apparatus according to FIG. 14, illustrated for the closure part of the apparatus situated in the open position.
Figure 16:
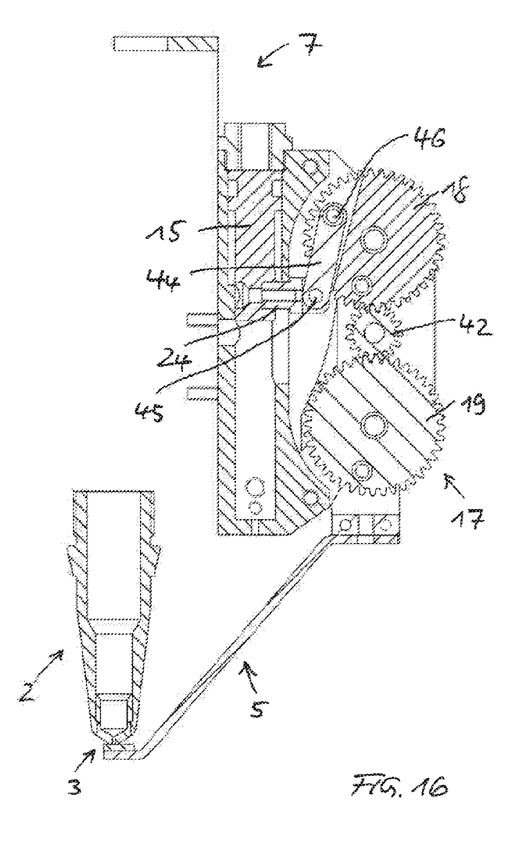
FIG. 16 shows a sectional representation of the apparatus according to FIG. 14, illustrated for the closure part of the apparatus situated in the closed position.
Figure 17:
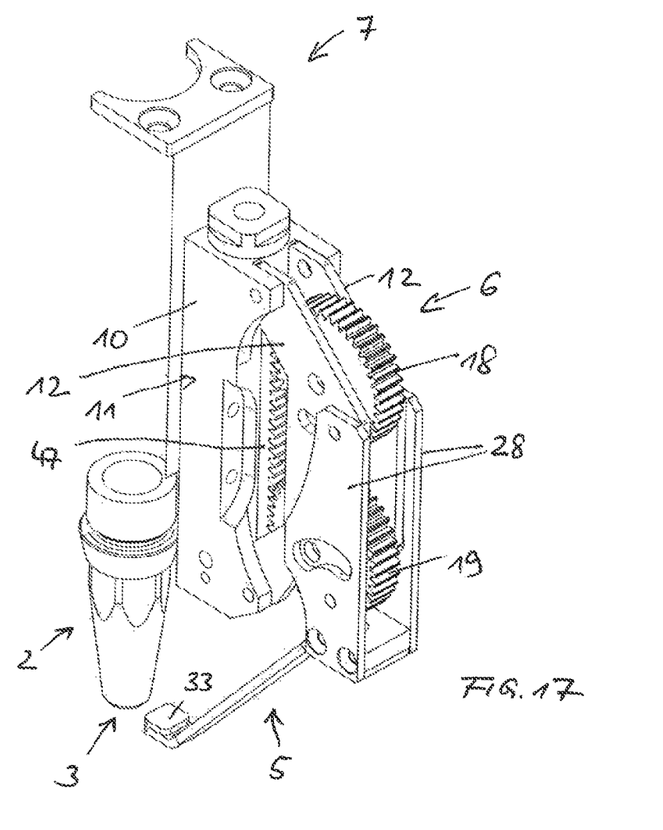
FIG. 17 shows for a third exemplary embodiment, the apparatus, thus shown without the housing of the metering valve, with the closure part situated in the open position, illustrated in a spatial view according to the representation of FIG. 7 relating to the first exemplary embodiment.
Figure 18:
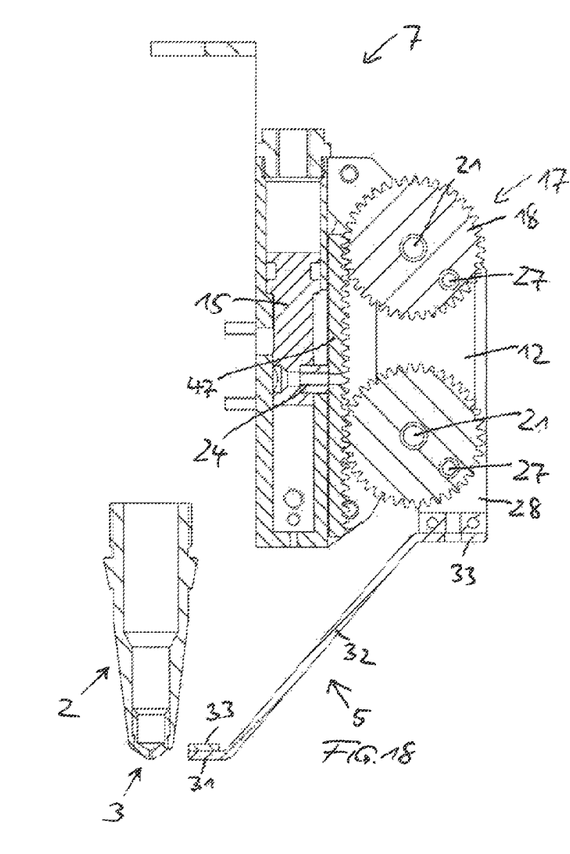
FIG. 18 shows a sectional representation of the apparatus according to FIG. 17, illustrated for the closure part of the apparatus situated in the open position.
Figure 19:
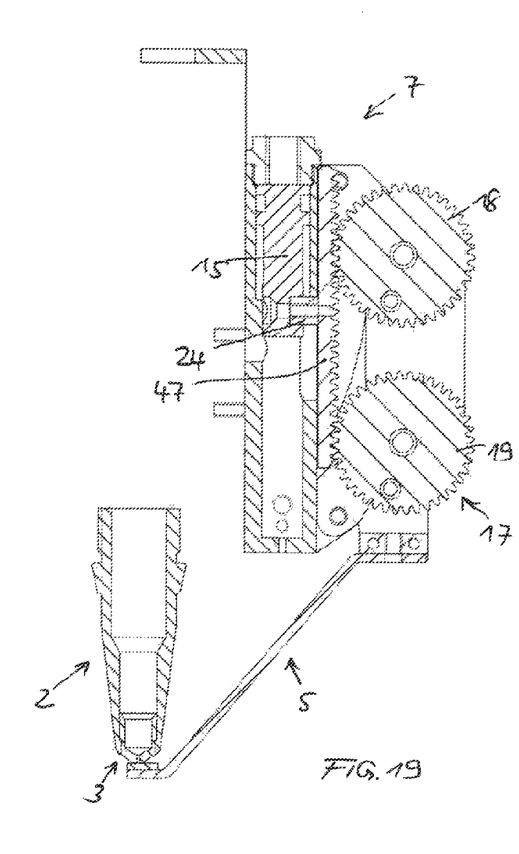
FIG. 19 shows a sectional representation of the apparatus according to FIG. 17, illustrated for the closure part of the apparatus situated in the closed position.

The second exemplary embodiment according to FIGS. 14 to 16 and the third exemplary embodiment according to FIGS. 17 to 19, respectively, differ from the first exemplary embodiment as described in FIGS. 1 to 13 only by the configuration of the transfer medium 17 that generates the angle synchronicity of the wheels 18, 19 that are mounted in the frame 7 so as to pivot. In order to avoid repetition with regard to the description of the second and third exemplary embodiment, components that are the same as in the first exemplary embodiment are labeled with the same reference numbers, for the sake of simplicity.

In the second exemplary embodiment according to FIGS. 14 to 16, the two wheels 18, 19 do not have a belt 20 looped around them, but rather instead of the belt, a further wheel 42, which is also configured as a gear wheel, is disposed between the wheels 18 and 19, which are configured as gear wheels. This wheel 42, which forms an integral part of the transfer medium 17, is mounted in the frame 7, in concrete terms in the frame section 12, so as to pivot about a bearing axle 43, where this bearing axle 43 is disposed perpendicular to the bearing axles 21 of the wheels 18 and 19. The wheel diameter of the wheel 42 is clearly less than the diameter of the respective wheel 18, 19. The wheels 18, 19 are configured to be identical, therefore configured as identical gear wheels, thereby making it possible to synchronously drive the wheel 22 by means of the wheel 18 and to drive the wheel 19 by means of this wheel 22. This configuration of the transfer medium 17 as a set of gears thereby brings about the same synchronous movement of the wheels 18 and 19 as the configuration of the transfer medium 17 in the first exemplary embodiment, which has the belt drive.

The wheel 18 is driven by means of the actuator 11, where the connecting element 24 connected with the piston 15 is connected with a rod 24, so as to pivot, which rod is connected with the wheel 18, so as to pivot. The bearing axle 45 of connecting element 24 and rod 44, as well as the bearing axle 46 of rod 44 and wheel 18, are disposed parallel to the bearing axles 21, in each instance.

FIG. 14 and FIG. 15 show the arrangement of the actuator 11, of the connecting element 24, and of the rod 44 in the open position of the closure part 5.

FIG. 16 shows the arrangement of the actuator 11, of the connecting element 24, and of the rod 44 in the closed position of the closure part 5.

The third exemplary embodiment differs from the first exemplary embodiment in that instead of a belt 20, particularly a toothed belt that loops around the wheels 18, 19, particularly gear wheels, the two gear wheels 18, 19, which are configured to be identical, are in engagement with a rack 47 that forms an integral part of the transfer medium 17. This rack is connected with the actuator 11 by means of the connecting element 24. The rack 47 brings about synchronous rotational movement of the wheels 18, 19. The rack is moved by means of the actuator 11, in the movement direction of the piston 15.

FIGS. 17 and 18 show the rack 47 in its one end position, in which the movable closure part 5 is situated in the open position. FIG. 19 shows the rack 47 in the other end position, in which the closure part 5 is situated in its closed position.

REFERENCE SYMBOL LIST 1 housing
2 nozzle
3 nozzle end
4 exit opening
5 closure part
6 control element
7 frame
8 screw
9 exit axis
10 housing
11 actuator
12 frame section
13 connector
14 cylinder space
15 piston
16 spring
17 transfer medium
18 wheel
19 wheel
20 belt
21 bearing axle
22 straight line
23 belt section
24 connecting element
25 oblong hole
26 bearing element
27 pivot axle
28 bearing element section
29 connecting element
30 bearing section
31 closure part section
32 connecting arm
33 closure part surface
34 leading edge
35 straight connecting line
36 base element
37 plate
38 leading edge
39 tab
40 guide shoe
41 underside
42 wheel
43 bearing axle
44 rod
45 bearing axle
46 bearing axle
47 rack

The invention claimed is:

1. An apparatus for dispensing flowable substances, comprising:
   a nozzle (2) that has an exit opening (4) for dispensing the substances from the nozzle (2) in the region of a free nozzle end (3),
   a closure part (5) having a closure part surface (33) that faces the nozzle end (3), and
   a control element (6), disposed outside of the nozzle (2), configured to move the closure part (5), the closure part (5) configured to release the exit opening (4) in an open position and close the exit opening (4) in a closed position, in the region of the closure part surface (33),
   wherein the closure part surface (33) is delimited, in the movement direction of the closure part (5) from the open position to the closed position, by a leading edge (34), in the leading direction,
   wherein the closure part surface (33) is disposed next to the nozzle (2) and at a level upstream from the exit opening (4), with reference to the flow direction of the substances through the nozzle (2), in the open position,
   wherein the closure part (5) is connected to be moved from the open position to the closed position by the control element (6) so that the leading edge (34) of the closure part surface (33) is first moved past the free nozzle end (3) in the direction of the flow of the substances through the nozzle (2), and then the closure part surface (33) is moved to directly contact the nozzle (2) in the region of the exit opening (4), in a direction perpendicular to an exit axis (9) of the exit opening (4) of the nozzle (2).

2. The apparatus according to claim 1, wherein the nozzle (2) is configured to narrow in the direction of the nozzle end (3), and the closure part surface (33) is disposed next to the narrowing nozzle region in the open position.

3. The apparatus according to claim 1, wherein the closure part (5) has a spring property.

4. The apparatus according to claim 1, wherein the closure part (5), in the region of an end facing away from the control element (6), has a closure part section (31) that has the closure part surface (33).

5. The apparatus according to claim 4, wherein the closure part section (31) has a base element (36) and a plate (37) accommodated by the base element (36), wherein the plate (37) has the closure part surface (33) on its side facing away from the base element (36).

6. The apparatus according to claim 5, wherein the leading edge (34) of the closure part surface (33) of the plate-side closure part section (31) coincides with a leading edge (38) of the base element (36).

7. The apparatus according to claim 5, wherein the plate (37) is elastically deformable.

8. The apparatus according to claim 5, wherein the plate (37) has rubber-elastic properties.

9. The apparatus according to claim 1, wherein the closure part (5) has an end-side mounting section (30), in the region of which the closure part (5) is mounted on the control element side, the end-side closure part section (31), and a connecting arm (32) between mounting section (30) and closure part section (31).

10. The apparatus according to claim 1, wherein the closure part (5) is configured in plate shape.

11. The apparatus according to claim 1, wherein the closure part (5) is connected to be moved by the control element (6) such that the closure part surface (33) is moved parallel to the exit opening's surface when actuated when being moved from the open position to the closed position.

12. The apparatus according to claim 1, wherein the closure part (5) is connected to be moved by the control element (6) such that the closure part surface (33) is disposed perpendicular to an exit axis (9) of the exit opening (4) of the nozzle (2) when the closure part (5) is moved from the open position to the closed position.

13. The apparatus according to claim 1, wherein the closure part (5) is configured to be moved, by the control element (6) and the closure part surface (33) is moved in an arc shape from the open position to the closed position.

14. The apparatus according to claim 1, wherein the control element (6) has:
- a frame (7),
- a transfer medium (17) having wheels (18, 19), said transfer medium generating angle synchronicity of wheels (18, 19) mounted in the frame (7) so as to pivot,
- a drive (11, 16) for the transfer medium (17), to pivot the respective wheel (18, 19) in a first pivot direction and in a second pivot direction opposite to the first pivot direction,
- a bearing element (26) for the closure part (5), mounted in wheels (18, 19) so as to pivot, wherein the bearing element (26) is mounted about pivot axes (27) in said wheels (18, 19), so as to pivot, where said pivot axes (27) are disposed in the frame (7) parallel to the pivot axes (21) of said wheels (18, 19),
- wherein the closure part (5) is mounted in the bearing element (26).

15. The apparatus according to claim 14, wherein the transfer medium (17) is configured as a belt drive and that the drive (11, 16) for the belt drive (17) is mounted in the frame (7), wherein the drive (11, 16) has a connecting element (24) that can be moved back and forth, said connecting element (24) being connected with the belt (20), wherein the connecting element (24) is connected with a straight section of the belt (20) and can be moved in a straight line, in opposite directions.

16. An apparatus for dispensing flowable substances, comprising:
- a nozzle (2) that has an exit opening (4) for dispensing the substances from the nozzle (2) in the region of a free nozzle end (3),
- a closure part (5) having a closure part surface (33) that faces the nozzle end (3), and
- a control element (6), disposed outside of the nozzle (2), configured to move the closure part (5), the closure part (5) configured to release the exit opening (4) in an open position and close the exit opening (4) in a closed position, in the region of the closure part surface (33),
- wherein the closure part surface (33) is delimited, in the movement direction of the closure part (5) from the open position to the closed position, by a leading edge (34), in the leading direction,
- wherein the closure part surface (33) is disposed next to the nozzle (2) and at a level upstream from the exit opening (4), with reference to the flow direction of the substances through the nozzle (2), in the open position,
- wherein the closure part (5) is connected to be moved from the open position to the closed position by the control element (6) so that the leading edge (34) of the closure part surface (33) is first moved past the free nozzle end (3) in the direction of the flow of the substances through the nozzle (2), and then the closure part surface (33) is moved to contact the nozzle (2) in the region of the exit opening (4), in a direction perpendicular to an exit axis (9) of the exit opening (4) of the nozzle (2),
- wherein the control element (6) has:
  - a frame (7),
  - a transfer medium (17) having wheels (18, 19), said transfer medium generating angle synchronicity of wheels (18, 19) mounted in the frame (7) so as to pivot,
  - a drive (11, 16) for the transfer medium (17), to pivot the respective wheel (18, 19) in a first pivot direction and in a second pivot direction opposite to the first pivot direction,
  - a bearing element (26) for the closure part (5), mounted in wheels (18, 19) so as to pivot, wherein the bearing element (26) is mounted about pivot axes (27) in said wheels (18, 19), so as to pivot, where said pivot axes (27) are disposed in the frame (7) parallel to the pivot axes (21) of said wheels (18, 19), and
  - wherein the closure part (5) is mounted in the bearing element (26).

17. The apparatus according to claim 16, wherein the transfer medium (17) is configured as a belt drive and that the drive (11, 16) for the belt drive (17) is mounted in the frame (7), wherein the drive (11, 16) has a connecting element (24) that can be moved back and forth, said connecting element (24) being connected with the belt (20), wherein the connecting element (24) is connected with a straight section of the belt (20) and can be moved in a straight line, in opposite directions.

* * * * *